United States Patent [19]
Eggers et al.

[11] 3,838,267
[45] Sept. 24, 1974

[54] NIGHT FISHING LIGHT

[76] Inventors: Larry A. Eggers; Walter A. Eggers, both of 1330 E. Atlantic, both of Springfield, Mo. 65803

[22] Filed: Mar. 23, 1973

[21] Appl. No.: 344,134

[52] U.S. Cl. ........ 240/6.4 F, 240/8.18, 240/10.6 R, 240/52.2
[51] Int. Cl......... F21v 33/00, B60g 1/26, F21l 7/00
[58] Field of Search ........... 240/8.18, 6.4 F, 10.6 R, 240/52.2

[56] References Cited
UNITED STATES PATENTS

| | | | |
|---|---|---|---|
| 2,744,187 | 5/1956 | Moak | 240/8.18 |
| 2,812,423 | 11/1957 | Penna | 240/8.18 |
| 2,932,018 | 4/1960 | Schwartz | 240/8.18 X |
| 3,201,580 | 8/1965 | Moore | 240/10.6 R |

*Primary Examiner*—Richard A. Wintercorn
*Attorney, Agent, or Firm*—Clarence A. O'Brien; Harvey B. Jacobson

[57] ABSTRACT

A light for night fishing, consisting primarily of a suction cup mounted on a plastic box having a removable lens secured to the open end from which light is emitted from a snapably releasable bulb, the device including a brightness control, an on and off switch, and insulated battery clips for securement to the boat's power supply or to an automobile battery.

1 Claim, 3 Drawing Figures

PATENTED SEP 24 1974  3,838,267

NIGHT FISHING LIGHT

This invention relates to illuminating devices and more particularly to a night fishing light.

It is therefore the principal object of this invention to provide a night fishing light which will be suction cup secured to a boat so as to enable the user to direct a light towards the shore.

Another object of this invention is to provide a night fishing light which will have rheostat control means so as to adjust the brightness to whatever natural light is available at night, the light being adjusted to whatever light is required for the user to see the brush and bank edge for night casting in order to catch bass and other fish.

Still another object of this invention is to provide a night fishing light of the type described which will be small enough in size so as to be placed into a fishing tackle box.

Yet another object of this invention is to provide a night fishing light which will have plastic box enclosure means for a removable five-watt full control rheostat operated bulb, the bulb being quickly releasable from spring clips of a bulb mounting block on the interior of the box of the device, the box having extending cord means with copper plated battery clips having plastic sleeved handles.

Other objects of the invention are to provide a night fishing light which is simple in design, inexpensive to manufacture, rugged in construction, easy to use, moisture proof and efficient in operation.

These and other objects will be readily evident upon a study of the following specification together with the accompanying drawing wherein.

Figures 1, 2:
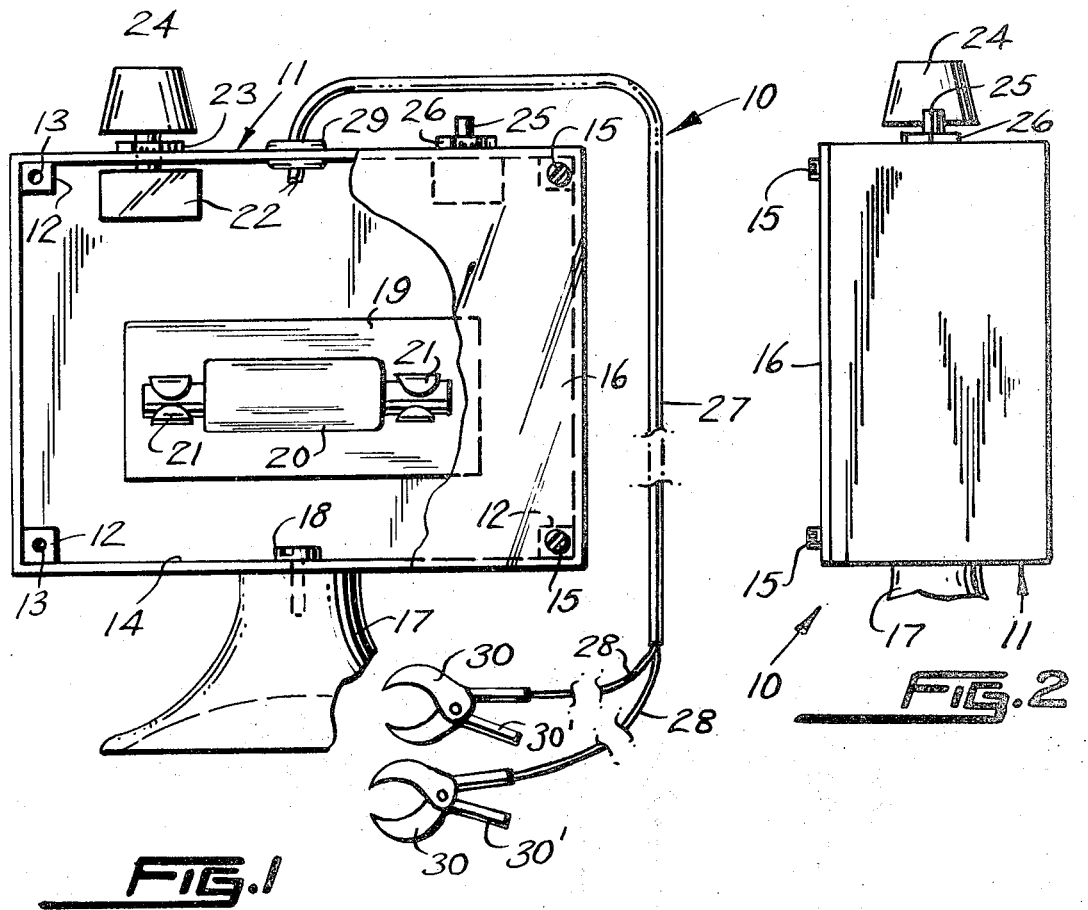
FIG. 1 is a front view of the present invention shown in elevation and partly broken away.
FIG. 2 is a fragmentary side view of FIG. 1.
Figure 3:
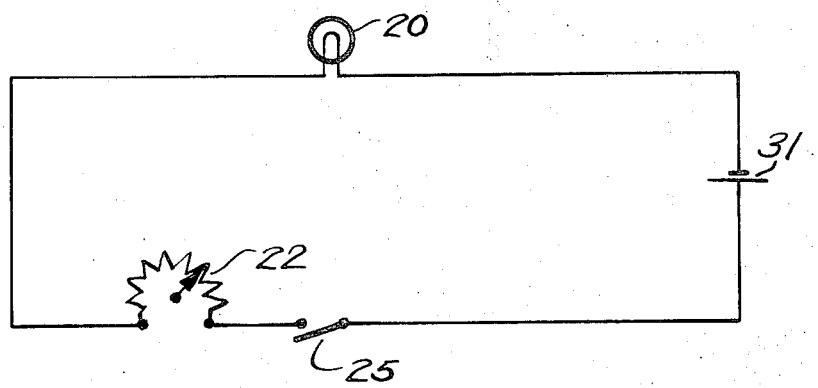
FIG. 3 is a schamatic wiring diagram of the present invention.

According to this invention, a night fishing light 10 is shown to consist of a hollow rectangular configurated plastic box 11 having corner projections 12 with threaded openings 13 positioned partially away from the opening 14 of box 11. The threaded openings 13 and projections 12 provide a means for receiving screw fasteners 15 which serve to render the lens 16 secure over the opening 14 of box 11.

A suction cup 17 is secured to the bottom of box 11 by means of a machine screw 18, the suction cup 17 enabling box 11 to be held fast to a desired surface onboard a boat.

A rectangular mounting bulb block 19 of suitable insulating material, is fixedly secured in a suitable manner (not shown) within the rear of box 11 and provides for the engagement of bulb 20 by means of the spring clips 21 projecting from bulb block 19. A five-watt full control rheostat 22 is secured within the upper extremity of box 11 by means of a nut fastener 23, the rheostat 22 having a rotatable knob 24 for controling the brightness of bulb 20. An on-off switch 25 is spaced apart from rheostat 22 within the upper extremity of box 11 and is secured thereto by means of a nut fastener 26.

An electric cord 27 having a pair of wires 28 extends out of a grommet 29 secured within the upper surface of box 11, the wires 28 being terminated on the exterior of box 11, by copper plated battery tips 30 having plastic sleeved handles 30'.

In use, light 10 is held fast to a surface of the boat by means of the suction cup 17 and the battery clips 30 are clipped onto the boat battery 31 or a separate automobile battery which will supply power means for lighting bulb 20 which will emit light through the special lens 16 secured by fasteners 15 to box 11.

What I now claim is:

1. A night fishing light, comprising, in combination:
   a. a hollow box of rectangular configuration and having a rear wall, a top wall, a bottom wall, a pair of side walls, and a front opening coextensive with the rear wall;
   b. a planar lens of rectangular configuration and secured to the box and arranged over the opening thereof;
   c. a suction cup secured to the bottom wall of the box and arranged for enabling the box to be held fast to a desired surface of a boat, the suction cup being secured to the bottom wall of said box externally by means of a screw fastener carried on the interior of said box, a plurality of corner projections carried within said box providing threadable engagement means for screw fasteners which render the rectangular lens secured to the opening of said box in front of said bulb;
   d. a rectangular bulb block constructed from an insulating material and affixed to the rear wall of the box, the block being provided with spaced spring clips arranged projecting from the block, the block having a longer extent from side wall to side wall of the box and the spring clips being spaced along this longer extent;
   e. an elongated bulb having spaced end portions quickly releasably, engagingly retained by the spring clips and arranged for providing light emission through the lens and toward a shore line;
   f. a full control rheostat electrically connected to the bulb for controlling the brightness of the bulb, the rheostat being mounted on the top wall of the box and including a manually manipulatable rotatable brightness controlling knob;
   g. cord means for connecting the rheostat and bulb to a battery which supplies power for lighting the bulb, the cord means including wires provided with copper plated battery clips for engagement with a battery externally of said light so as to provide a power source for said bulb; and
   h. an on-off switch electrically connected to the bulb and cord means for opening and closing a circuit between the bulb and battery, the switch being mounted on the top wall of the box.

* * * * *